(12) United States Patent
Billman et al.

(10) Patent No.: US 11,531,739 B1
(45) Date of Patent: Dec. 20, 2022

(54) AUTHENTICATING USER IDENTITY BASED ON DATA STORED IN DIFFERENT LOCATIONS

(71) Applicant: UIPCO, LLC, San Antonio, TX (US)

(72) Inventors: Bradly Jay Billman, Celina, TX (US); Jennifer Hunt Erickson, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 294 days.

(21) Appl. No.: 16/917,280

(22) Filed: Jun. 30, 2020

(51) Int. Cl.
| | |
|---|---|
| *G06F 21/32* | (2013.01) |
| *H04L 9/32* | (2006.01) |
| *H04L 9/40* | (2022.01) |
| *G06F 21/60* | (2013.01) |
| *B64C 39/02* | (2006.01) |
| *G06F 16/9038* | (2019.01) |
| *H04L 9/08* | (2006.01) |

(52) U.S. Cl.
CPC ............ *G06F 21/32* (2013.01); *H04L 9/3231* (2013.01); *H04L 63/0861* (2013.01); *B64C 39/024* (2013.01); *B64C 2201/127* (2013.01); *G06F 16/9038* (2019.01); *G06F 21/602* (2013.01); *H04L 9/0866* (2013.01)

(58) Field of Classification Search
None
See application file for complete search history.

(56) References Cited

U.S. PATENT DOCUMENTS

| | | | |
|---|---|---|---|
| 10,169,937 B1* | 1/2019 | Zwink | G07C 9/23 |
| 2012/0169463 A1* | 7/2012 | Shin | G06F 21/6245 |
| | | | 340/5.82 |
| 2017/0134375 A1* | 5/2017 | Wagner | H04L 63/0861 |
| 2017/0346830 A1* | 11/2017 | Goldfarb | H04L 67/01 |
| 2019/0361605 A1* | 11/2019 | Kanno | G06F 12/1408 |
| 2020/0082062 A1* | 3/2020 | Mequanint | G06F 21/44 |

FOREIGN PATENT DOCUMENTS

| | | | | |
|---|---|---|---|---|
| CN | 111353735 A | * | 6/2020 | ......... B64C 39/024 |
| GB | 2504747 A | * | 2/2014 | ............ G06F 21/36 |

\* cited by examiner

*Primary Examiner* — Benjamin E Lanier
(74) *Attorney, Agent, or Firm* — Fletcher Yoder, P.C.

(57) ABSTRACT

A system may include a first computing device that receives identification data and an identifying parameter associate with a user and requests a second computing device to authenticate the user based on the identification data. The second computing system may query a first database for a first portion of authentication data based on the identifying parameter and then determine that a second portion of the authentication data exists based on the first portion of the authentication data. The first portion of the authentication data may include a pointer that identifies a second database that includes the second portion of authentication data such that the second computing device may retrieve it. The first and second portions of the authentication data may then be combined to form a combined authentication data to then be compared with the identification data, and the results of the comparison are sent to the first computing system.

18 Claims, 2 Drawing Sheets

AUTHENTICATING USER IDENTITY BASED ON DATA STORED IN DIFFERENT LOCATIONS

BACKGROUND

The present disclosure relates generally to authentication systems. More specifically, the present disclosure relates to providing vendors a way to authenticate a user's identity by way of a trusted network that utilizes a multi-point authentication technique.

As more vendors use digital authentication methods for verifying a user's identity, account information, and other details concerning a user to facilitate a financial transaction, data concerning the user may be stored on various databases for different vendors. This distribution of personal and private data may increase the chances that the data may be compromised by hackers or other entities attempting to obtain the secure information. As such, improved systems for storing personal or sensitive data concerning a user, while maintaining the ability to securely authenticate a user and facilitate a transaction are desirable.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a first computing device and a second computing device. The first computing device may be configured to receive identification data associated with a user and an identifying parameter associated with the user. The second computing device may receive a request from the first computing device to authenticate the user based on the identification data. The second computing system may then query a first database for a first portion of authentication data based on the identifying parameter that can be used to authenticate the identity of the user based on the identification data. The second computing system may then determine that there is a second portion of the authentication data based on the first part of the authentication data. The first part of the authentication data may include a pointer that may identify a second database that includes the second portion of authentication data such that the second computing device may query the second database in response to determining that the second portion of the authentication data exists. Additionally, the second computing device may then combine the first portion of the authentication data and the second portion of the authentication data to form a combined authentication data, and then compare the identification data and the combined authentication data. As such, the second computing device may send the result of the comparison to the first computing device.

In another embodiment, a non-transitory computer-readable medium may include computer-executable instructions that, when executed, cause a processor to perform operations including receiving a request to authenticate identification data associated with a user from an electronic device. The processor may then query a first database for a part of the authentication data based on the identifying parameter associated with the user, and then retrieve the part of the authentication data from the first database. The part of the authentication data may include a pointer that may indicate that an additional part of authentication data exists and further identify a second database that includes the additional part of authentication data. The processor may then retrieve the additional part of the authentication data from the second database, and then combine the part of the authentication data and the additional part of the authentication data to form a combined authentication data. The processor may then compare the combined authentication data and the identification data to then authenticated an identity of the user based on the comparison, and then send a notification representative of a result of the authentication to the electronic device.

In yet another embodiment, a method may include receiving, via a processor, a request from an electronic device to authenticate identification data associated with a user. The method may also include querying a first server for a first portion of the authentication data based on one or more identifying parameters associated with the user and then retrieving the first portion of the authentication data. The first portion of the authentication data may include a pointer that may indicate that a second portion of authentication data exists. The method may include retrieving the second portion of the authentication data from the second server such that the first portion of the authentication data and the second portion of the authentication data may be combined to form a combined authentication data. The method may further include comparing the combined authentication data and the identification data such that results may be generated based on the comparison, and the results may be sent to the electronic device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
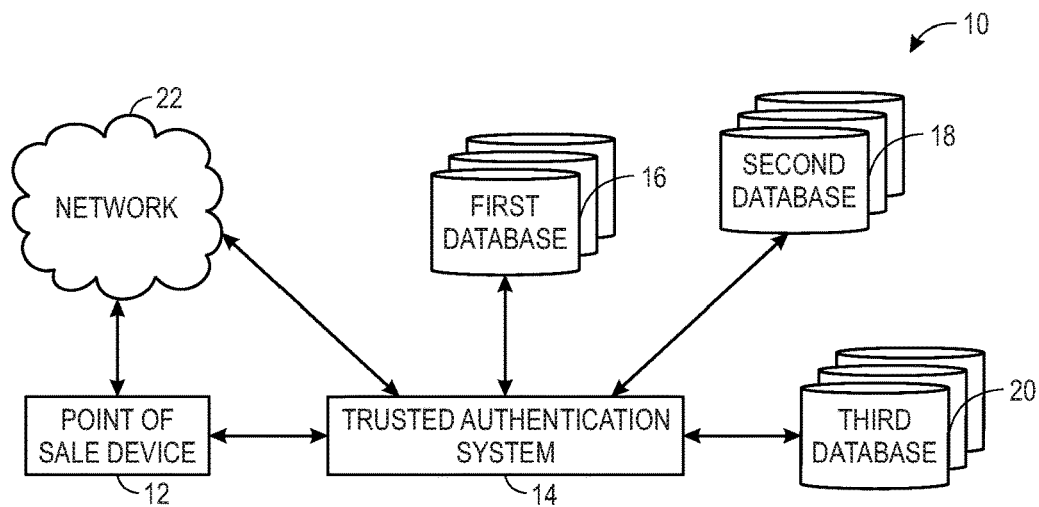
FIG. 1 is a diagram of an authentication system that authenticates identification data, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, vendors may desire a secure system to digitally authenticate user identities when facilitating financial transactions such as purchases. To better ensure that data related to users' identities and other sensitive information (e.g., financial data, demographic data) are securely stored while remaining useful to vendors, the presently disclosed embodiments detail certain systems and methods for authenticating identification data that may be distributed across multiple data storage components. For example, in one embodiment, a point of sale device may receive a request to purchase an item using a user's digital account and a user's digital identification data. Using the identification data, the point of sale device may query a trusted authentication system to authenticate the identification data. The point of sale device may have an established relationship with the trusted authentication system, such that the vendor trusts the authentication results of the trusted authentication system. In some embodiments, the authentication data used to authenticate the identification data may be located in multiple databases with each database having a non-overlapping part of the authentication data, such that no database has the same portion of authentication data in another database. The trusted authentication system may query a first database for a part of authentication data based on the information provided to the point of sale device related to the identification data. The trusted authentication system may receive a first portion of the authentication data from the first database. The trusted authentication system may then determine whether the authentication data includes an additional part based on the retrieved portion of the authentication data. That is, each portion of the authentication data may provide an indication with regard to a storage location of another portion of the authentication data. As such, the trusted authentication system may continue to identify additional parts of authentication data from the previously retrieved parts, such that the trusted authentication system collects each part of the authentication data from different databases until no additional parts remain. After collecting each of the parts of the authentication data, the trusted authentication system may combine the parts of the authentication data based on an algorithm that may be identified from one or more of the parts of authentication data. The trusted authentication system may then determine if the identification data received from the point of sale device is authenticated based on the combined parts of the authentication data. The results of the authentication process may then be sent to the point of sale device. In this way, a user's data may be stored in different locations, thereby making each individual part of the authentication data useless without the collection of all of the parts. Indeed, the user's data may be partially exposed if one of the data locations is compromised, but the data is useless without acquiring each portion of the data. Additional details with regard to authenticating data in this manner will be provided below with reference to FIGS. 1-4.

By way of introduction, FIG. 1 illustrates an authentication system 10 that includes certain components, electronic devices, and a collection of electronic devices that may enable different computing systems to perform the methods described herein. As shown in FIG. 1, the authentication system 10 may include a point of sale device 12, a trusted authentication system 14, a first database 16, a second database 18, and a third database 20 that may be communicatively coupled to a network 22. Although three databases are shown in the current embodiment, any number of databases may be appropriate to carry out the functions of the authentication system 10. The point of sale device 12 may receive a request to authenticate a user identity (e.g., identification data) and query the trusted authentication system 14 to authenticate the user identity. In some embodiments, the point of sale device 12 may include a laptop computer, a personal computer, tablet, server, smart phone, a virtual machine, cloud-based computing system, and the like. The point of sale device 12 may be associated with a vendor of goods or services, such that the vendor may employ the point of sale device 12 to assist in a transaction.

Figure 2:
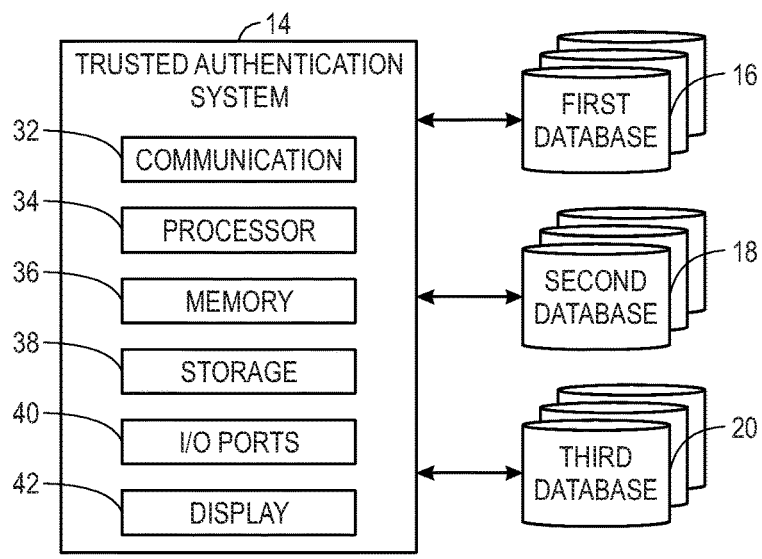
FIG. 2 illustrates a block diagram of a trusted authentication system employed by the authentication system of FIG. 1, in accordance with embodiments described herein.

Moreover, in some embodiments the trusted authentication system 14 may include a laptop computer, a personal computer, tablet, server, smart phone, a virtual machine, cloud-based computing system, and the like, and is discussed in further detail with reference to FIG. 2. The trusted authentication system 14 may be affiliated with a bank, insurance company, government entity, third-party identification verification, and the like, such that a vendor may associate the trusted authentication system 14 with trusted and reliable source of information associated with the identification of a person. The trusted authentication system 14 may query a single one of, any combination of, or any additional database in addition to the first database 16, the second database 18, and a third database 20 for one or more parts of authentication data that is based on the identification data. In some embodiments, the databases may include data associated with the identity of a user (e.g., identification data) such as name, phone number, work address, home address, school history, social security number, and the like. In addition, the databases may include biometric data (e.g., facial image, fingerprint data) that may be used to authenticate identification data of a user. The first database 16, the second database 18, and the third database 20 may be associated with the trusted authentication system 14 or a part of an outside data source and are configured such that each database is at a different location and may contain non-overlapping information.

In some embodiments, the trusted authentication system 14 may identify an algorithm from the one or more parts of authentication data, such that the algorithm may be used to determine how to (i.e., in what order or specific combination) to combine the one or more parts of authentication. After combining the authentication data, the trusted authentication system 14 may determine if the identification data is authenticated based on the combined authentication data and the identification data sent with the request by the point of sale device 12. The trusted authentication system 14 may then send the authentication results to the point of sale device 12.

The network 22 may be any suitable computer network that enables different electronic devices (e.g., servers), communication components (e.g., routers), and the like to facilitate the communication between the trusted authentication system and other components that may be part of the authentication system 10. In certain embodiments, the trusted authentication system 14, the point of sale device 12, the first database 16, the second database 18, and the third database 20 may be in direct communication with one another via a respective communication channel. However, it should be noted that each of the aforementioned devices may also be coupled to each other via the network 22, as discussed above.

With the foregoing in mind, the trusted authentication system 14 may receive a request to authenticate identification data from the point of sale device 12. If the identification data is authenticated by the trusted authentication system 14, the trusted authentication system 14 may then provide the point of sale device 12 with a confirmation visualization that displays the results of the authentication request. Additional details with regard to the process undertaken by the trusted authentication system 14 and the point of sale device 12 will be discussed below with reference to FIGS. 3 and 4.

In some embodiments, to perform its respective operations, the trusted authentication system 14 may query and retrieve data from one or more databases such as the first database 16, the second database 18, and the third database 20. In some embodiments, the databases may include data associated with the identity of a user (e.g., identification data) such as name, phone number, work address, home address, school history, social security number, and the like. The databases may each have a part of the identification data that may be combined to complete the identification data such that the data in each database has no overlap. For example, there may be two databases that contain the physical address for a user's home address. One database may contain data associated with the house number, such as 1731, and the other database may contain data associated with the street name, such as 17$^{th}$ Street, such that no single database contains all of the data.

With the foregoing in mind, the trusted authentication system 14 may receive part of the authentication data from the first database 16 and determine whether there is an additional part of authentication data remaining based on data or an indication present within the received part of the authentication data. The trusted authentication system 14 may continue to retrieve additional parts of the authentication data until there are no additional parts remaining. If the part of the authentication data does not an indication of another part being available, then the trusted authentication system 14 may determine that no additional parts of authentication data are available. For example, the part of the authentication data received from the first database 16 may include a pointer for an additional part of the authentication data such that the trusted authentication system 14 may then query the second database 18 to receive the additional part of the authentication data based on the pointer. The trusted authentication system 14 may continue to do another iteration of this process with the third database 20 based on acquired pointer data, and even more iterations with additional databases until there are no additional parts of authentication data remaining. After receiving the final remaining part of the authentication data (e.g., the most recent part of the authentication data did not have a pointer for an additional part of authentication data), the trusted authentication system 14 may then identify an algorithm from the one or more parts of the authentication data to combine the one or more parts.

The trusted authentication system 14 may identify an algorithm indicator from one of the parts of the authentication data. The algorithm indicator may indicate that the part of authentication that includes the algorithm indicator may also include an algorithm for combining all of the parts of the authentication data. Additionally or alternatively, the algorithm indicator may indicate that another part of the authentication may include the algorithm, such that the trusted authentication system 14 may retrieve the algorithm from another part of the authentication data. The trusted authentication system 14 may combine the parts of the authentication data based on the algorithm and determine if the identification data is authenticated based on a comparison between the identification data and the combined authentication data. For instance, the identification data provided to the point of sale device 12 may cause the point of sale device 12 to identify a first pointer that provides an indication of a location (e.g., database) of a first part of the authentication data. The first pointer may be stored in a storage location accessible to the point of sale device 12 and generated at some time prior to receiving the identification data.

In any case. the point of sale device 12 may send the first pointer to the trust authentication system 14, which may then receive the identification data from the point of sale device 12 and retrieve each part of the authentication data using the process generally described above. After each part of the authentication data is received, the trust authentication system 14 may determine whether the identification data matches the authentication data and send the results of the determination to the point of sale device 12. Additional details with regard to the process undertaken by the trusted authentication system 14 will be discussed below with reference to FIG. 4.

To perform some of the operations described in the present disclosure, the trusted authentication system 14 may include certain components to facilitate these operations. With this in mind, FIG. 2 is a block diagram of example components within the trusted authentication system 14. Referring to FIG. 2, the trusted authentication system 14 may include a communication component 32, a processor 34, a memory 36, a storage 38, input/output (I/O) ports 40, a display 42, and the like. The communication component 32 may be a wireless or wired communication component that may facilitate communication between the trusted authentication system 14, the point of sale device 12, the first database 16, the second database 18, the third database 20, the network 22, and the like.

The processor 34 may be any type of computer processor or microprocessor capable of executing computer-executable code. The processor 34 may also include multiple processors that may perform the operations described below.

The memory 36 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 34 to perform the presently disclosed techniques. The memory 36 and the storage 38 may also be used to store data, analysis of acquired data, various other software applications, and the like. The memory 36 and the storage 38 may represent non-transitory computer-readable media (e.g., any suitable form of memory or storage) that may store the processor-executable code used by the processor 34 to perform various techniques described herein. It should be noted that non-transitory merely indicates that the media is tangible and not a signal.

The I/O ports 40 may be interfaces that may couple to other peripheral components such as input devices (e.g., keyboard, laser scanner, mouse, microphone), sensors, input/output (I/O) modules, and the like. The display 42 may operate to depict visualizations associated with software or executable code being processed by the processor 34. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen).

It should be noted that the components described above with regard to the trusted authentication system 14 are exemplary components and the trusted authentication system 14 may include additional or fewer components as shown. Additionally, it should be noted that the point of sale device 12 may also include similar components as described as part of trusted authentication system 14.

Although the embodiments described herein are detailed as being performed by the trusted authentication system 14, it should be noted that the presently disclosed techniques may be performed in conjunction with a cloud-based computing system, a server, or the like. For example, the trusted authentication system 14 may receive a request to authenticate identification data, and the trusted authentication system 14 may perform some analysis or operations described herein with the additional computing resources provided by a server, a cloud-computing system, or the like. In some embodiments, the trusted authentication system 14 may use a computing application, which may be stored in the memory 36, and executed by the processor 34 to perform the embodiments described herein. The computer application may access the computing resources of the trusted authentication system 14 to perform its operations or interact with the computing resources of another connected computing system (e.g., cloud-computing system). In any case, for the purposes of discussion, the presently disclosed techniques will be described as being performed by trusted authentication system 14. As such, it should be understood that the presently disclosed techniques are not limited to being performed by the trusted authentication system 14.

Figure 3:
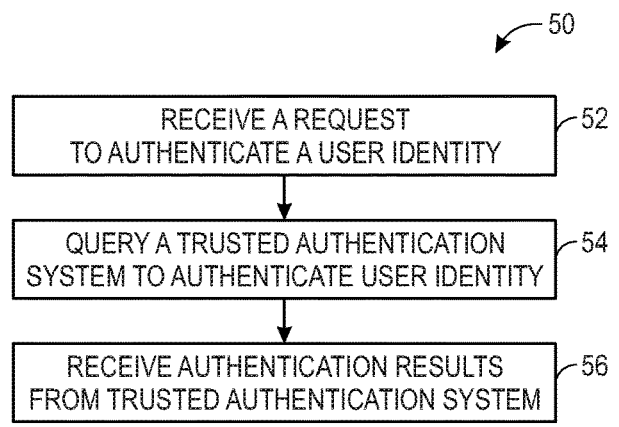
FIG. 3 illustrates a flow chart of a method for a point of sale device to request authentication of a user's identity, in accordance with embodiments described herein.
Figure 4:
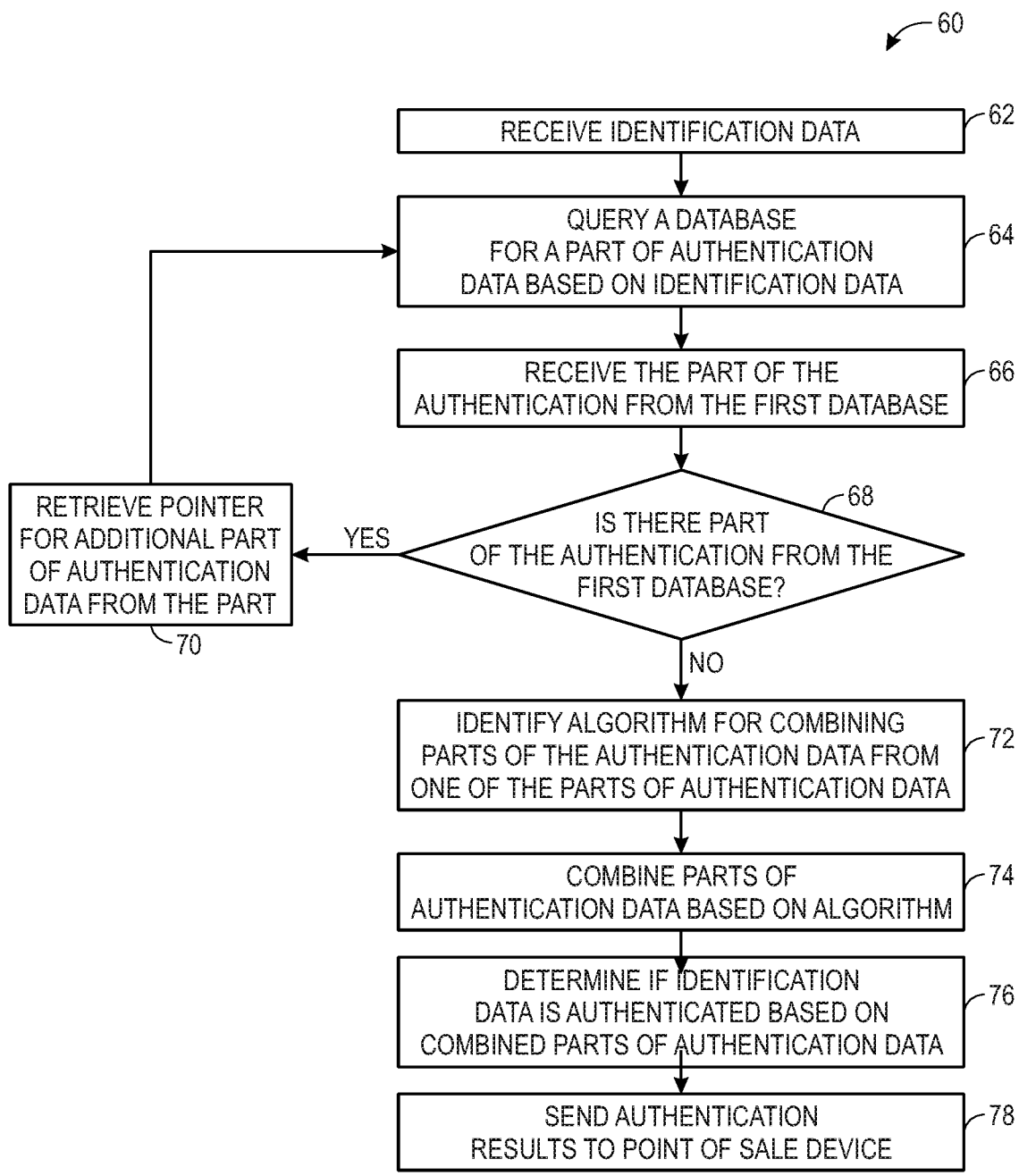
FIG. 4 illustrates a flow chart of a method for a trusted authentication system to authenticate a user's identity, in accordance with embodiments described herein.

Keeping the foregoing in mind, FIG. 3 illustrates a flow chart of method 50, the point of sale device 12 may receive a request to authenticate a user identity (e.g., identification data). As such, the point of sale device 12 may query the trusted authentication system 14 to authenticate the user identity, and then the point of sale device 12 may receive the results of the authentication from the trusted authentication system 14. It should be noted that although method 50 is described below in a particular order, it should be understood that the method 50 may be performed in any suitable order.

Referring now to FIG. 3, at block 52, the point of sale device 12 may receive a request from a vendor to authenticate a user identity (e.g., identification data). As such, the request may include the identification data. In some embodiments, the identification data may include biometric data such as fingerprint data, facial image data, retinal data, voice data, and the like. Additionally, the request may include identifying parameters such as a name, user name, social security number, drivers license number, customer number, or some other identifying information for querying additional information to authenticate the identity of the user. The identifying parameters, in one embodiment, may be acquired via image data representative of an identification card associated with a school, a social security number, a driver's license, and the like. In some embodiments, the point of sale device 12 may receive the biometric data and use the identifying parameters to query the trusted authentication system 14 to retrieve authentication data associated with the identifying parameters from the databases or other storage component. The trusted authentication system 14 may retrieve the authentication data that may correspond to the biometric data acquired by the point of sale device 12 to authenticate whether the user is indeed the individual, as claimed in the identifying parameters.

In some embodiments, the point of sale device 12 may utilize the use of an unmanned aerial vehicle (UAV) to facilitate the gathering of the identification data or the identifying parameters. In some embodiments, the UAV may include a camera such that it may gather imaging data (e.g., identification data) of a user within a proximity of the point of sale device 12. Additionally or alternatively, the UAV may include an image sensor, a fingerprint scanner, an iris scanner, and the like, such that the UAV may collect biometric data (e.g., identification data) to be authenticated. For example, in some embodiments the UAV may use the image sensor or the camera to capture image data of someone's face or identification card (e.g., passport, driver's license, social security number, and the like), such that the image data (e.g., identification data) may be sent with the request to the trusted authentication system 14 to authenticate the identity of the user.

After receiving the request to authenticate the user's identity, at block 54, the point of sale device 12 may send a request to a trusted authentication system 14 to authenticate the user identity based on the identification data (e.g., biometric data) and the identifying parameters. In some embodiments, the point of sale device 12 may have a previously established relationship with the trusted authentication system 14, such that the point of sale device 12 may provide some details or instructions for initiating an authentication process based on the received identification data. Additionally or alternatively, the point of sale device 12 may communicate with the trusted authentication system 14 by utilizing a directory of trusted authentication systems 14 that may possess authentication data for verifying the identification data. For example, a vendor may pay a subscription fee to have access to the directory of trusted authentication systems 14. As previously mentioned, in some embodiments, the trusted authentication system 14 may be a bank, a government institution (e.g., a public school, a department of public safety (DPS), a police department, and the like), a credit bureau, and/or an insurance company, among other things. Additional details with regard to the trusted authentication system 14 may be described below with reference to FIG. 4.

At block 56, the point of sale device 12 may receive the results of the authentication request from the trusted authentication system 14. That is, the trusted authentication system 14 may retrieve authentication data that may be used to verify that the identification data provided to the point of sale device 12 matches the authentication data that corresponds to the user of the identifying parameter. In some embodiments, the trusted authentication system 14 may provide the results without providing any details (e.g., name, identification number) associated with the user. For example, the results may include text confirming the authentication or indicating that authentication was not successful. Additionally or alternatively, the results may include a scaled score that may be associated with the results. For example, the trusted authentication system 14 may determine that there was a 10 percent, 25 percent, 50 percent, 75 percent, or 100 percent match between the authentication data and the identification data.

As mentioned above, FIG. 4 illustrates a method 60 that may be employed by the trusted authentication system 14 to authenticate the identification data received by the point of sale device 12. Like the method 50, the following description of the method 60 may be performed in any suitable order and by any suitable computing device. For purposes of this discussion, method 60 will be described as being performed by the trusted authentication system 14.

At block 62, the trusted authentication system 14 receives the identification data from the point of sale device 12 with the request to authenticate the user. As mentioned above, the identification data may be associated with a user and may include biometric data such as fingerprint data, facial image data, retinal data, voice data, and the like. In some embodiments, the trusted authentication system 14 may receive the identification data from a UAV. For example, in some embodiments, the UAV may be equipped with an image sensor or a fingerprint scanner, such that the UAV may collect fingerprint data (e.g., identification data) to be sent to the trusted authentication system 14 to be authenticated.

In addition to the identification data, the trusted authentication system 14 may receive information to associate the identification information to the user, such as the user's name, username, customer number, or any other identifying parameter. At block 64, the trusted authentication system 14 may query a database for a part of the authentication data that is based on the identifying parameter received with the request. The trusted authentication system 14 may query a first database 16 to identify the part of the authentication data associated with the user using the identifying parameter. The database 16 or storage component that stores the authentication data may be organized according to the identifying parameter provided by the trusted authentication system 14. That is, the databases may store authentication data for a number of users based on the user's name, facial image, identification number, customer number, or other identifying parameter. For example, if the identification data includes an image of a driver's license, the trusted authentication system 14 may retrieve the identifying parameter from the driver's license (e.g., a driver's license number, an address, a name, and the like) and query the first database 16 to retrieve authentication data that for verifying the identity of the user that corresponds to the identifying parameter. As mentioned above, the trusted authentication system 14 may first identify just part of the authentication data that may be located in the first database 16.

At block 66, the trusted authentication system 14 may retrieve the part of the authentication data identified in the first database 16 at block 64. In some embodiments, the part of the authentication data from the first database 16 may correspond to any portion of the authentication data. That is, the part of the authentication data may be a first part of an ordered series of parts of the authentication data. Alternatively, the part of the authentication data may be a different aspect of the authentication data that may be unrelated to an order. For example, the part of the authentication data may include a first portion of biometric data that corresponds to the user. After receiving each of the parts of the authentication data, the trusted authentication system 14 may combine the parts in a suitable matter, as will be described below.

After receiving the part of the authentication data, at block 68, the trusted authentication system 14 may determine if there is an additional part of authentication data. In some embodiments, the most recently received part of the authentication data may include an indication that an additional part of the authentication data exists. For example, the most recently received part of the authentication data may include the pointer that may indicate where a subsequent part of the authentication is located. The pointer may include a web address, a database name, or other storage location that specifies the location of another part of the authentication data. The trusted authentication system 14 may continue this operation and determine that there is an additional part of authentication data remaining until the most recently retrieved part of the authentication data does not include a pointer indicating an additional part of authentication remains. Additionally or alternatively, the part of the authentication data may be part of an ordered series of parts such that the trusted authentication system 14 may determine from the pointer that there are no more remaining parts of the ordered series remaining. For example, the part of the authentication data may include a pointer that indicates that it is the third part out of five total parts such that two remaining parts remain to be retrieved.

If the trusted authentication system 14 determines that there is an additional part of authentication data remaining, the trusted authentication system 14 may proceed to block 70 and may retrieve a pointer for the additional part of the authentication data from the most recently received part of the authentication data. In some embodiments, the pointer may identify a location (e.g., a second database 18) of the additional part of the authentication data to the trusted authentication system 14. In some embodiments, the additional parts of the authentication data may be stored in the databases may be using different encryption techniques and the pointer may include a decryption key for the additional part of the authentication data. After retrieving the pointer, the trusted authentication system 14 may return to block 64 and iteratively perform the operation of blocks 64-70 until there are no more additional parts of authentication data. In some embodiments, the pointer may identify the location for one or more additional parts of the authentication data, such that the trusted authentication system 14 may retrieve the one or more additional parts simultaneously from the identified databases.

Returning back to block 68, if there are no remaining parts of the authentication data to be retrieved, the trusted authentication system 14 may move to block 72. At block 72, the trusted authentication system 14 may identify an algorithm for combining the parts of the authentication data from one of the parts of the authentication data. In some embodiments, the algorithm for combining the parts of the authentication may be a part of one of the parts of the authentication data. The trusted authentication system 14 may identify the algorithm through an indicator (e.g., an algorithm indicator) that may be a part of one of the parts of the authentication data. As mentioned above, the algorithm may provide instructions (e.g., order, decryption techniques) on how to combine the parts of the authentication data. For example, there may be a nine-digit number (e.g., a social security number) spread out among 9 databases, such that the trusted authentication system 14 may receive the nine digits, however the trusted authentication system 14 may not know the proper combination of the nine digits. In some embodiments, the trust authentication system 14 may identify an algorithm from one of the nine parts of data that indicates in what order the nine digits should go. In some embodiments, there may be a first algorithm for combining a first set of parts of the authentication data and a second algorithm for combining a second sets parts of the authentication data. After the trusted authentication system 14 identifies the algorithm for combining the parts of the authentication data, at block 74, the trusted authentication system 14 may combine the parts of the authentication data based on the algorithm.

At block 76, the trusted authentication system 14 may determine whether the identification data is authenticated based on the combined parts of the authentication data and the identification data (e.g., biometric data) received from the point of sale device 12. In some embodiments, the trusted authentication system 14 may compare the identification data with the combined parts of the authentication data and determine if the identification data is authenticated based on a comparison between the combined authentication data and the identification data. For example, the trusted authentication system 14 may evaluate whether the comparison exceeds a threshold percentage (e.g., 100%, 90%) of matching features. For example, the trusted authentication system may retrieve a name, address, place of employment, and social security number that is associated with the identification data. However, the combined parts of authentication data may be missing one or more of the parts of the combined authentication data may have conflicting data (e.g., a user may change their name, address, or place of employment). As such, the trusted authentication system 14 may authenticate the identification data so long as the threshold amount of data matches.

At block 78, the trusted authentication system 14 may send authentication results to the point of sale device 12. In some embodiments, the authentication results may not include any identifying information (e.g., name, address, social security, and the like) and may only include simple confirmation of authentication or the opposite. In some embodiments, the authentication results may include a scaled score to indicate a confidence level of the authentication. For example, a perfect match may correspond to a score of 100 out of 100 such that there is 100 percent confidence in the results of the authentication process. Moreover, a score of 75 out of 100 may be associated with the results of the authentication process such that it may correspond to a confidence level that indicates the identification data is most likely authenticated, so on and so forth. Additionally or alternatively, the authentication results may be based on a threshold number of set by the point of sale device 12. For example, a vendor may indicate through the point of sale device 12 that a scaled score exceeding a certain threshold number may be enough to be considered authenticated, otherwise a scaled score that is less than their set threshold number should be considered as not authenticated. In some embodiments, the point of sale device 12 may automatically proceed with the transaction if the identification data is authenticated.

The technical effects of the systems and methods described herein include manipulating and providing data to authenticate someone's identity. Such on-demand information may enable quick and easy authentication of a customer's identity by a vendor. Moreover, by storing different portions of authentication data in a distributed fashion across different storage components, the presently disclosed techniques improve the security of the stored authentication data.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
a first computing device configured to receive identification data associated with a user and an identifying parameter associated with the user; and
a second computing device configured to:
receive a request from the first computing device to authenticate the user based on the identification data;
query a first database for a first portion of authentication data based on the identifying parameter, wherein the authentication data is configured to authenticate an identify of the user based on the identification data;
determine whether a second portion of the authentication data exists based on the first portion of the authentication data, wherein the first portion of the of the authentication data comprises a pointer configured to identify a second database comprising the second portion of the authentication data; query the second database for the second portion of the authentication data in response to determining that the second portion of the authentication data exists;
identify an algorithm for combining the first portion and the second portion, wherein the first portion, the second portion, or both comprise the algorithm;
combine the first portion of the authentication data and the second portion of the authentication data to form a combined authentication data based on the algorithm;
compare the identification data and the combined authentication data; and
send a result of the comparison to the first computing device.

2. The system of claim 1, wherein the second portion of the authentication data is encrypted and the pointer comprises a decryption key for decrypting the second portion of the authentication data.

3. The system of claim 1, wherein the identification data comprises fingerprint data, facial image data, retinal data, voice data, or any combination thereof.

4. The system of claim 1, wherein the second computing device is configured to generate a scaled score associated with the comparison of the identification data and the combined authentication data.

5. The system of claim 4, wherein the first computing system is configured to perform a transaction in response to the scaled score exceeding a threshold.

6. The system of claim 1, comprises an unmanned aerial vehicle (UAV) configured to gather the identification data from the user.

7. The system of claim 6, wherein the UAV comprises a camera configured to capture image data, wherein the identification data comprises the image data.

8. The system of claim 6, wherein the UAV is configured to gather biometric data, wherein the identification data from the user comprises the biometric data.

9. The system of claim 6, wherein the UAV comprises a fingerprint scanner configured to capture fingerprint data from the user, wherein the identification data from the user comprises the fingerprint data.

10. The system of claim 1, wherein the pointer is indicative of the first portion of the authentication data being part of an ordered series of parts.

11. The system of claim 1, wherein the first database is a first enclave server associated with the second computing device and the second database is a second enclave server associated with the second computing device.

12. A non-transitory computer-readable medium comprising computer-executable instructions that, when executed, cause a processor to perform operations comprising:
receiving a request to authenticate identification data associated with a user from an electronic device;
querying a first database for a part of the authentication data based on an identifying parameter associated with the user;
retrieving the part of the authentication data from the first database, wherein the part of the authentication data comprises a pointer configured to identify a second database comprising an additional part of authentication data;
retrieving the additional part of the authentication data from the second database;
identifying an algorithm for combining two or more parts of the authentication data from the part of the authentication data, the additional part of the authentication data, or both;
combining the part of the authentication data and the additional part of the authentication data to form a combined authentication data based on the algorithm;
comparing the combined authentication data and the identification;
authenticating an identity of the user based on the comparison of the combined authentication data and the identification data; and
sending a notification representative of a result of the authentication to the electronic device.

13. The non-transitory computer-readable medium of claim 12, wherein the processor is further configured to perform the operations comprising combining the part of the authentication data and the additional part of the authentication data to form the combined authentication data based on the algorithm.

14. The non-transitory computer-readable medium of claim 12, wherein the pointer comprises a decryption key for decrypting the additional part of the authentication data.

15. A method, comprising:
receiving, via a processor, a request from an electronic device to authenticate identification data associated with a user;
querying, via the processor, a first server for a first portion of the authentication data based on one or more identifying parameters associated with the user;
retrieving, via the processor, the first portion of the authentication data from the first server, wherein the first portion of the authentication data comprises a pointer configured to indicate that a second portion of authentication data exists;
retrieving, via the processor, the second portion of the authentication data from a second server;
identifying an algorithm for combining two or more portions of the authentication data from the first portion of the authentication data, the second portion of the authentication data, or both;
combining, via the processor, the first portion of the authentication data and the second portion of the authentication data to form a combined authentication data based on the algorithm;
comparing, via the processor, the combined authentication data and the identification;
generating, via the processor, an authentication result based on the comparison of the combined authentication data and the identification data; and
sending, via the processor, the authentication result to the electronic device.

16. The method of claim 15, wherein the pointer is configured to identify the second server comprising the second portion of authentication data.

17. The method of claim 16, comprising determining that a third portion of the authentication data does not exist before combining the first portion of the authentication data and the second portion of the authentication data.

18. The method of claim 15, comprising:
decrypting, via the processor, the first portion of the authentication data using a first decryption key; and
decrypting, via the processor, the second portion of the authentication data using a second decryption key.

* * * * *